United States Patent [19]
Smith

[11] Patent Number: 6,085,775
[45] Date of Patent: Jul. 11, 2000

[54] CONVERTIBLE MANIFOLD FOR A FUEL DELIVERY SYSTEM

[75] Inventor: Leon B. Smith, Greensboro, N.C.

[73] Assignee: Marconi Commerce Systems Inc., Greensboro, N.C.

[21] Appl. No.: 09/211,912

[22] Filed: Dec. 15, 1998

[51] Int. Cl.[7] ........................................ G05D 7/06
[52] U.S. Cl. .............................. 137/269; 137/270
[58] Field of Search ............................ 137/269, 270, 137/597, 884

[56] References Cited

U.S. PATENT DOCUMENTS

| | | |
|---|---|---|
| 2,893,605 | 7/1959 | Anderson . |
| 3,366,134 | 1/1968 | Donner . |
| 3,520,315 | 7/1970 | Dobrikin . |
| 3,786,831 | 1/1974 | Clippard, III . |
| 4,627,462 | 12/1986 | Lyons ...................................... 137/270 |
| 4,938,251 | 7/1990 | Furrow et al. . |
| 5,490,612 | 2/1996 | Coquerel et al. . |
| 6,026,834 | 2/2000 | Azima ................................ 137/270 X |

*Primary Examiner*—Kevin Lee
*Attorney, Agent, or Firm*—Coats & Bennett, P.L.L.C.

[57] ABSTRACT

A manifold for distributing fuel within a fuel distribution system that is convertible between a multi-hose output design and a single hose output design. The manifold includes a main housing, and a plurality of ports connected with the main housing for inputting and outputting fuel. The ports are selectively positionable between an open position to allow the fuel to pass through the port, and a closed position to prevent fuel to pass through the port. A cover is positioned on the main housing for selectively directing the flow of the fuel through the main housing.

28 Claims, 7 Drawing Sheets

CONVERTIBLE MANIFOLD FOR A FUEL DELIVERY SYSTEM

BACKGROUND OF THE INVENTION

1. Field of the Invention

The present invention relates generally to a manifold for a fuel delivery system and, more particularly, to a manifold having a number of flowpaths that can be selectively segregated or combined to provide for a variety of fuel output arrangements.

2. Description of the Prior Art

Fuel dispensing systems generally include a basic configuration of a certain number of input lines that bring product into the system and one or more output lines for dispensing the various products or combinations thereof to the user. There are three basic designs currently used in the majority of dispensing systems. A multi-hose output design typically has a number of input lines bringing product into the system and an equal number of output lines wherein the product is maintained separate throughout the system. A single-hose blender design is one having at least two input lines from which product from each line is diverted alone or in combination with another line at defined ratios to a single "blended" output line. A single-hose non-blending design has a number of separate input lines and a single output line for directing a select product through the single output hose without blending.

Currently, it is time consuming and costly to convert between a single-hose output design and a multi-hose output design and vice versa. Converting from a multi-hose output design to a single hose output design requires removal of extra output lines and directing all input lines into the single output. For converting from a single hose output design to a multi-hose output design, it is necessary to add extra output lines. Additionally, a unique manifold is required in each case. Both the cost and time requirements could be greatly reduced by a standardized design that accommodates either single-hose or multi-hose output designs with only minor alterations. Therefore, there remains a need for a convertible manifold for connecting with the fuel delivery system that is selectively positionable to provide for a variety of output designs.

SUMMARY OF THE INVENTION

The present invention is generally directed to a manifold for distributing fuel within a fuel distribution system that is convertible between a multi-hose output design and a single hose output design. This design can be installed within a fuel distribution system and provides for a variety of output designs depending upon the needs of the customer. The manifold is constructed to receive at least two different types of fuel from a tank or other source and distribute the fuel further to a dispenser unit. The manifold includes a first flowpath between a first port and a second port, and a second flowpath between a third port and a fourth port. A first embodiment of the present invention includes a cover selectively positionable between a first position segregating the first flowpath from the second flowpath, and a second position providing a shared flowpath between the first flowpath and the second flowpath.

The second, fourth, and fifth ports are adaptable for either inputting fuel into the manifold or outputting fuel from the manifold. The invention may further include a third flowpath that extends between a fifth port and one of the first or second flowpaths. A blocking means may be positioned on each of the second, fourth, and fifth ports that provides for selectively opening and closing the ports to fuel flow.

The present invention is further directed to a manifold for dispensing fuel that includes a manifold body having a first flowpath extending between a first port and a second port and a first aperture communicating with the first flowpath. A second flowpath extends between a third port and a fourth port and includes a second aperture communicating with the second flowpath. One embodiment includes a cover having a chamber and a blocking portion alternatively mountable between a first position wherein the blocking portion prevents communication between the first and second apertures, and a second position wherein the chamber couples the first and second apertures providing communication between the first flowpath and the second flowpath.

Preferably, the manifold is operable for dispensing fuel in a multi-hose output design, a single-hose blended design, and a single-hose non-blended design. A mounting surface may be positioned about the first and second flowpaths for selectively mounting the cover in the first and second positions. In one embodiment, the blocking portion of the cover may be a base portion configured to cover at least one of the first and second apertures in the first closed position.

The mounting surface may further include a plurality of mounts for receiving a plurality of fasteners to maintain the cover on the mounting surface. The cover may include apertures that align with the mounts for receiving the fasteners, and the apertures are symmetrically positioned about the cover to provide the apertures to align with the mounts in the first and second positions. The chamber may extend above the mounting surface or it may extend below the mounting surface.

In another embodiment of the invention, the manifold includes a first flowpath that extends between a first port and a second port, a second flowpath extending between a third port and a fourth port, a first auxiliary flowpath extending from the first flowpath to a cover mounting surface, and a second auxiliary flowpath extending from the second flowpath to the cover mounting surface. A cover alternatively mounts to the cover mounting surface in a first position blocking flow between the first and second flowpaths and a second position to provide a flowpath between the first and second auxiliary flowpaths wherein a product introduced into the ports is combined forming a blended fuel.

In a second embodiment of the present invention, the cover mounted on the manifold includes an enlarged chamber that extends over both the first flowpath and the second flowpath. A blocking plate is removably positionable between the manifold and the cover to segregate the first flowpath from the second flowpath.

Preferably, the blocking plate and the cover are removably mounted on the manifold by a plurality of fasteners and the chamber may extend substantially the length of the cover. In this second embodiment, the blocking plate is removed to allow the communication between the first and second flowpaths. Alternatively, the blocking plate may be placed between the manifold and cover to segregate the two flowpaths. These and other aspects of the present invention will become apparent to those skilled in the art after a reading of the following description of the preferred embodiment when considered with the drawings.

DESCRIPTION OF THE PREFERRED EMBODIMENTS

Figure 1A:
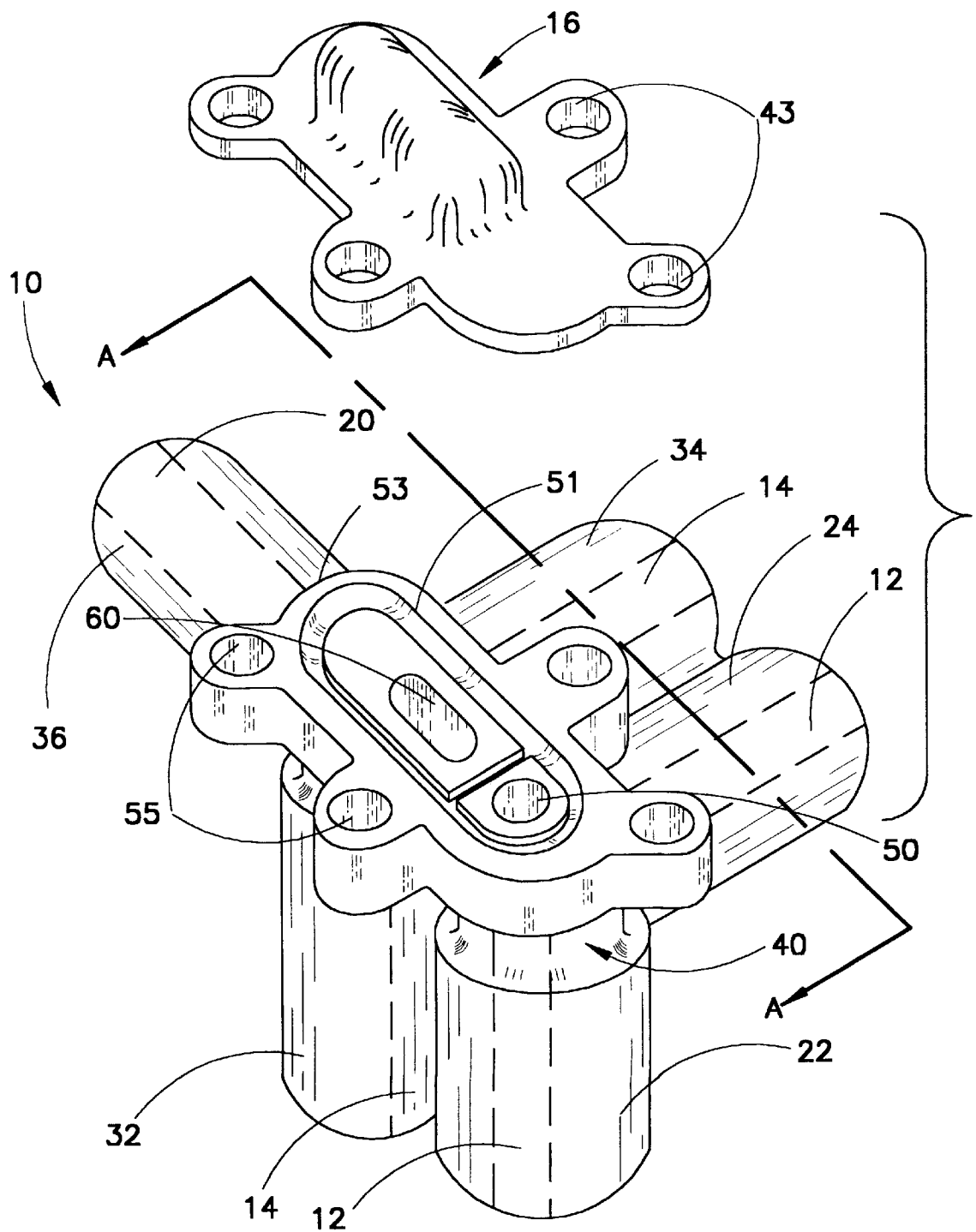
FIG. 1A is an exploded perspective view of the convertible manifold for a fuel delivery system constructed according to a first embodiment of the present invention.
Figure 1B:
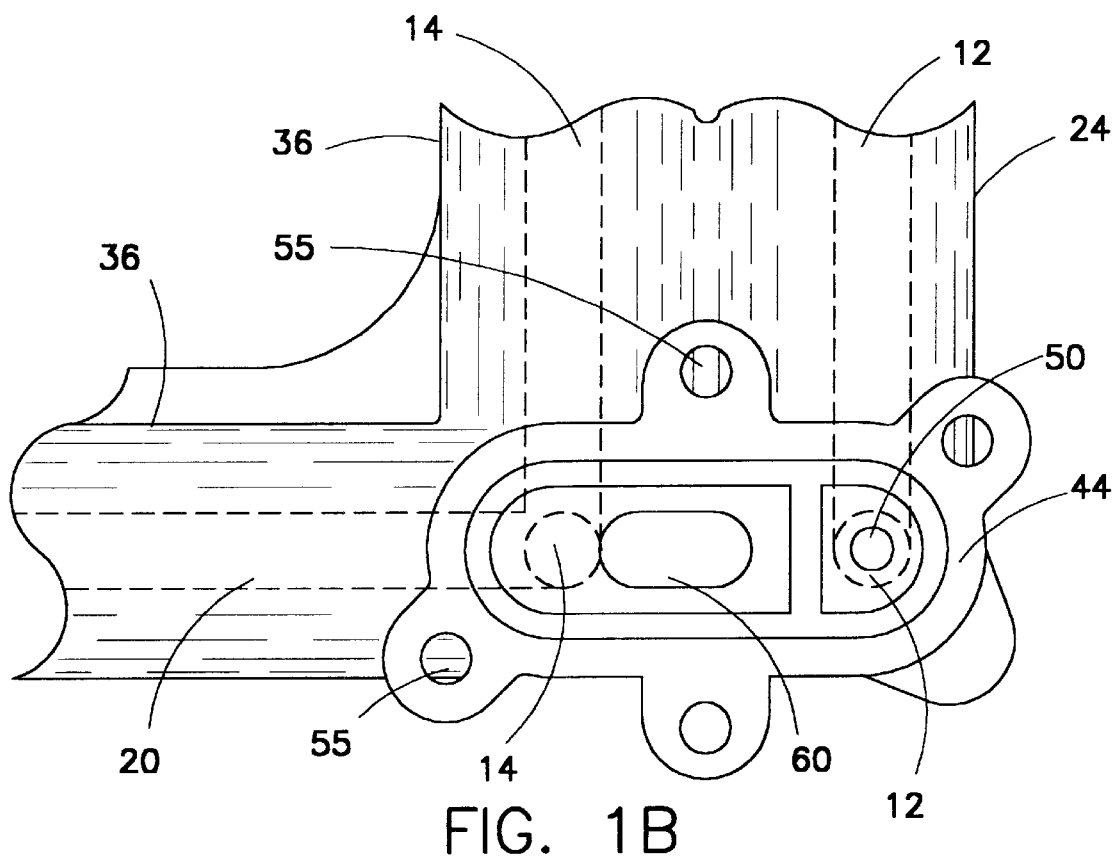
FIG. 1B is a top view of the present invention cut along line A—A of FIG. 1A.

In the following description, like reference characters designate like or corresponding parts throughout the several views. Also in the following description, it is to be understood that such terms as "forward," "rearward," "left," "right," "upwardly," "downwardly," an the like are words of convenience and are not to be construed as limiting terms.

Referring now to the drawings in general and FIG. 1A in particular, it will be understood that the illustrations are for the purpose of describing a preferred embodiment of the invention and are not intended to limit the invention thereto. As best seen in FIG. 1A, a convertible manifold for a fuel delivery system, generally designated 10, is shown constructed according to first embodiment of the present invention. The convertible manifold 10 preferably includes a first flowpath 12 extending through and between a first port 22 and a second port 24, a second flowpath 14 extending through and between a third port 32 and a fourth port 34, a third flowpath 20 within a fifth port 36, and a cover 16.

The first flowpath 12 extends through the first port 22 and the second port 24. A first aperture 50 is positioned near the intersection of the first port 22 and the second port 24, as illustrated in FIG. 1A and communicates with the first flowpath 12. The second flowpath 14 extends through the third port 32 and the fourth port 34. A second aperture 60 is positioned at the intersection of the third and fourth ports and communicates with the second flowpath 14. A mounting surface 44 extends about the first and second flowpaths and the first and second apertures 50, 60 provide for an attachment area to connect the cover 16 to the manifold 10. Manifold mounting apertures 55 are used to mount the cover 16 to the mounting surface 44.

Figure 1C:
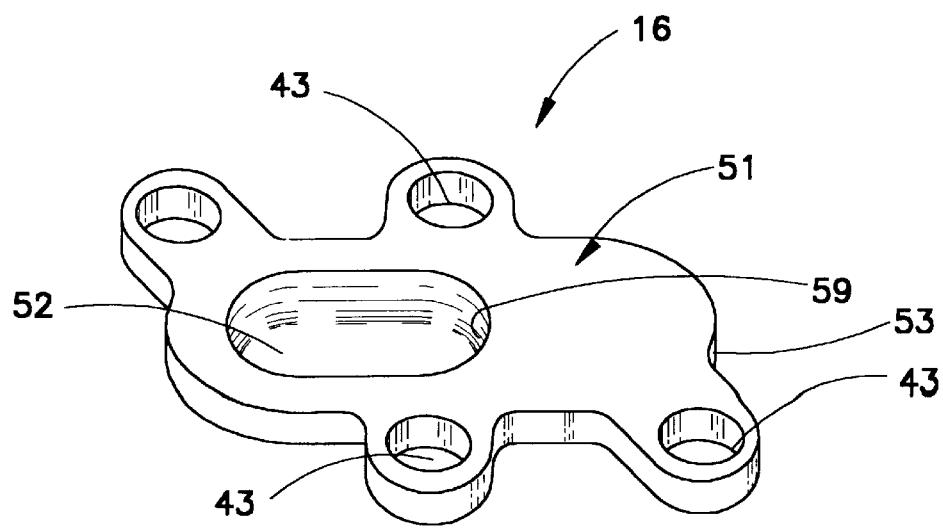
FIG. 1C is a perspective view of the cover constructed according to the first embodiment of the present invention.

The cover 16, as shown in FIG. 1C, is positioned to extend over the first aperture 50 and second aperture 60. The cover includes a base 51 that extends from a first edge 53 to an inside edge 59 of the chamber 52. Preferably, the chamber 52 is a bubble, cavity, groove, or the like formed in the cover 16. Mounting apertures 43 are spaced about the cover 16 to house fasteners for attaching the cover to the mounting surface 44. Preferably, the cover is held in position on the mounting surface via a plurality of removable fasteners such as bolts, screws, or other like means which can be repeatedly removed and retightened. The cover mounting apertures 43 are symmetrically spaced about the cover such that they align with the manifold mounting apertures 55 of the mounting surface in either a first position or a second position.

The cover 16 is selectively positionable to control the flow of fuel through the system. In a first position, the cover is placed such that the base 51 is positioned over either the first aperture 50 or second aperture 60 segregating the first flowpath from the second flowpath. In a second position, the cover is rotated approximately 180° relative to the first position to align the chamber over the first and second apertures 50, 60 in order to allow the first and second flowpaths 12, 14 to communicate. Preferably, the cover is positioned in an accessible area on the manifold to allow access when the convertible manifold is placed in the dispenser.

Optionally, a fifth port includes a third flowpath 20 that communicates with either the first flowpath 12 or the second flowpath 14 when the cover is in a closed position or with both flowpaths when the cover is in the open position.

Figure 2A:
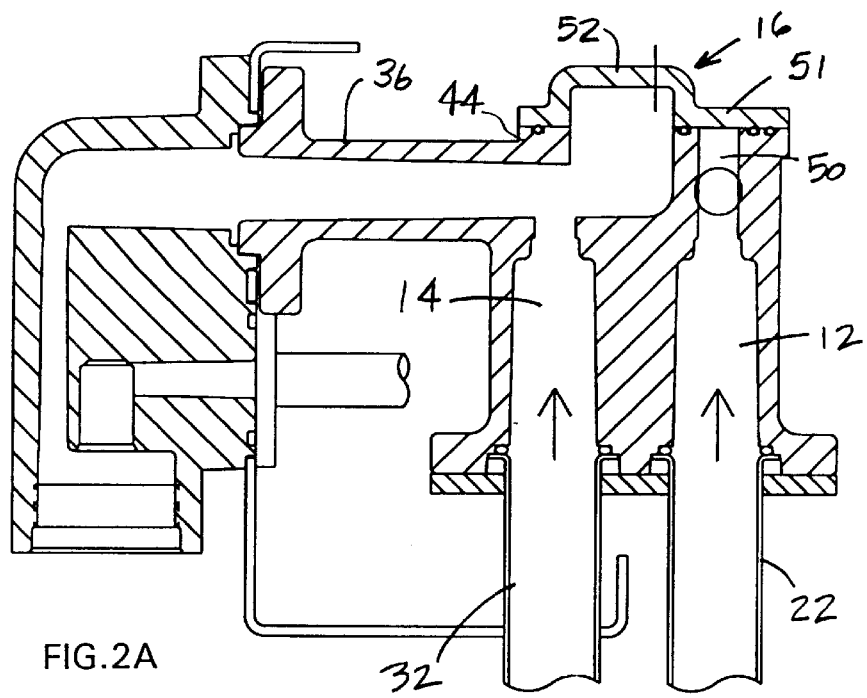
FIG. 2A is a side view of the first embodiment of the present invention having the cover in a closed position to block the first flowpath from the second flowpath.
Figure 2B:
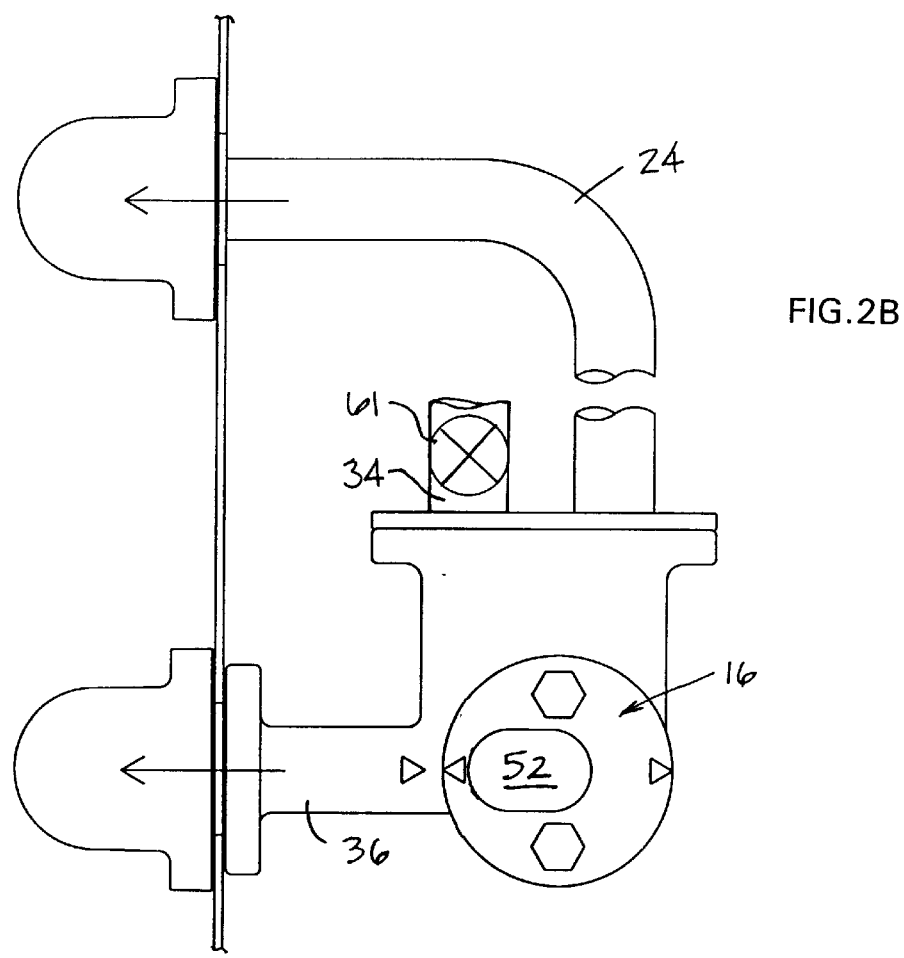
FIG. 2B is a top view of the embodiment illustrated in FIG. 2A illustrating the output portions of the flowpaths.

FIG. 2A illustrates a multi-hose configuration in which a first product is input through the first port 22 and a second product is introduced through the third port 32. The cover 16 is in a closed position segregating flowpaths 12, 14 and, thus, the separate products as the base 51 extends over the first aperture 50. The first product is directed through the second port 24. The second product is directed through either the fourth port 34 or fifth port 36. FIG. 2B illustrates the output of the multi-hose design in which the first product is input through the first port 22 and output through the second port 24. The second product is input through the third port 32 and is output through the fifth port 36.

The ports may include a blocking cap or seal 61, which prevents the flow of fuel. Preferably, the blocking cap or seal 61 is selectively positionable between an open position or closed position. As illustrated in FIG. 2B, the fourth port 34 is blocked thereby resulting in the product introduced through the third port 32 being output through the fifth port 36 while the cover is in the closed position.

Figure 3A:
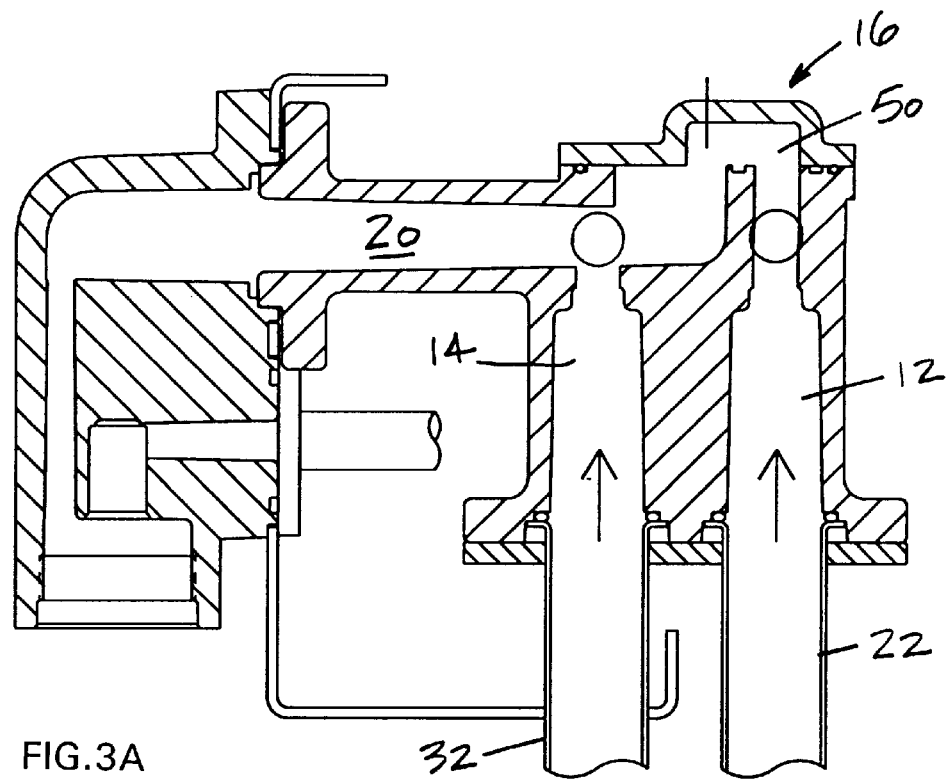
FIG. 3A is a side view of the first embodiment of the present invention illustrating the cover in the open position to connect the first flowpath with the second flowpath.
Figure 3B:
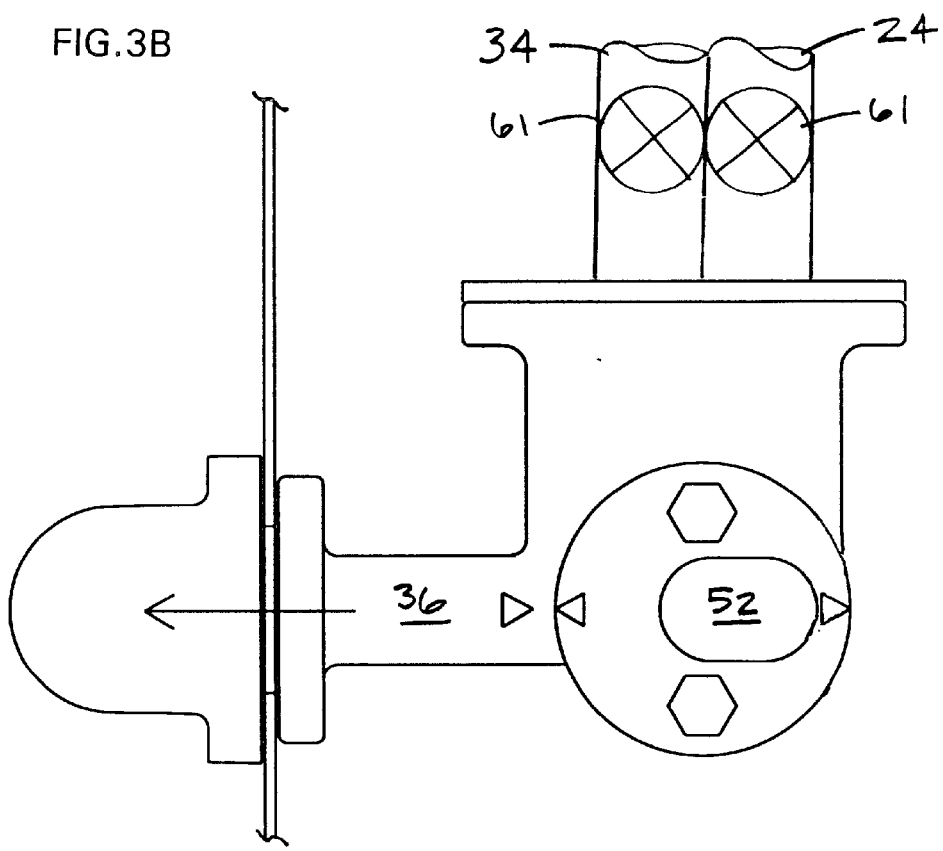
FIG. 3B is a top view of the embodiment illustrated in FIG. 3A illustrating a single output.

FIG. 3A illustrates a convertible manifold in which the cover 16 is in an open position such that chamber 52 is positioned to effectively connect the first aperture 50 and second aperture 60. When the cover is in this position, each flowpath and port is in fluid communication with one another. FIG. 3B is a top view of the manifold of FIG. 3A illustrating the single-hose blending design in which the product introduced at the first port 22 is blended with the product introduced through the third port 32 and output through the fifth port 36. Any port may be used for an output or input, and unused ports may be shutoff by blocking caps or seals 61. In the embodiment illustrated in FIG. 3B, the second port 24 and fourth port 34 are closed by blocking mechanisms 61 resulting in the fifth port 36 acting as the single-hose output line. In this configuration, the output through the fifth port 36 may be either exclusively a first product introduced through the first port 22, exclusively a second product input through the third port 32, or a blend of both products. It will be understood that the present invention includes any combination of blocking and opening the various ports to control the distribution of the product. By way of example, second port 24 and fourth port 34 may accommodate additional input lines for additional fuel products.

Figure 3C:
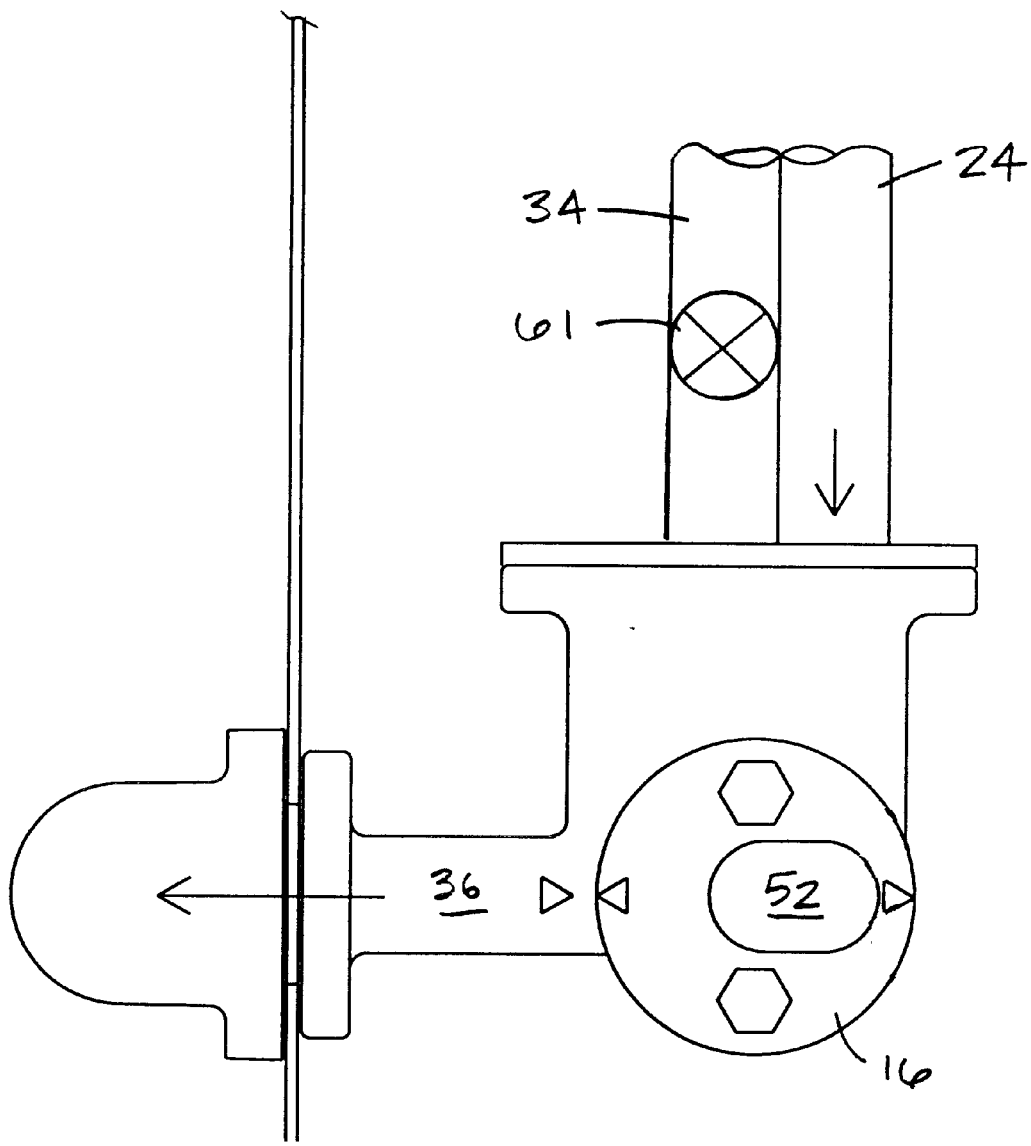
FIG. 3C is a top view of the embodiment illustrated in FIG. 3A illustrating an additional input line and a single output line.

A single-hose non-blended design is illustrated in FIG. 3A and FIG. 3C. FIG. 3A shows a design having product introduced through the first port 22 and second port 32 with the cover being in the open position and being output through the fifth port 36. As illustrated in FIG. 3C, a third product is input through the second port 24. The fourth port 34 is closed by blocking seal or cap 61 resulting in a single output through the fifth port. In the single-hose non-blended design, the products are kept separate despite being outputted through one universal output port. One skilled in the art will understand that this design may provide up to four separate input lines, which distribute to a single output line. Additional ports may be added to accommodate any number of input and output ports.

Figure 4:
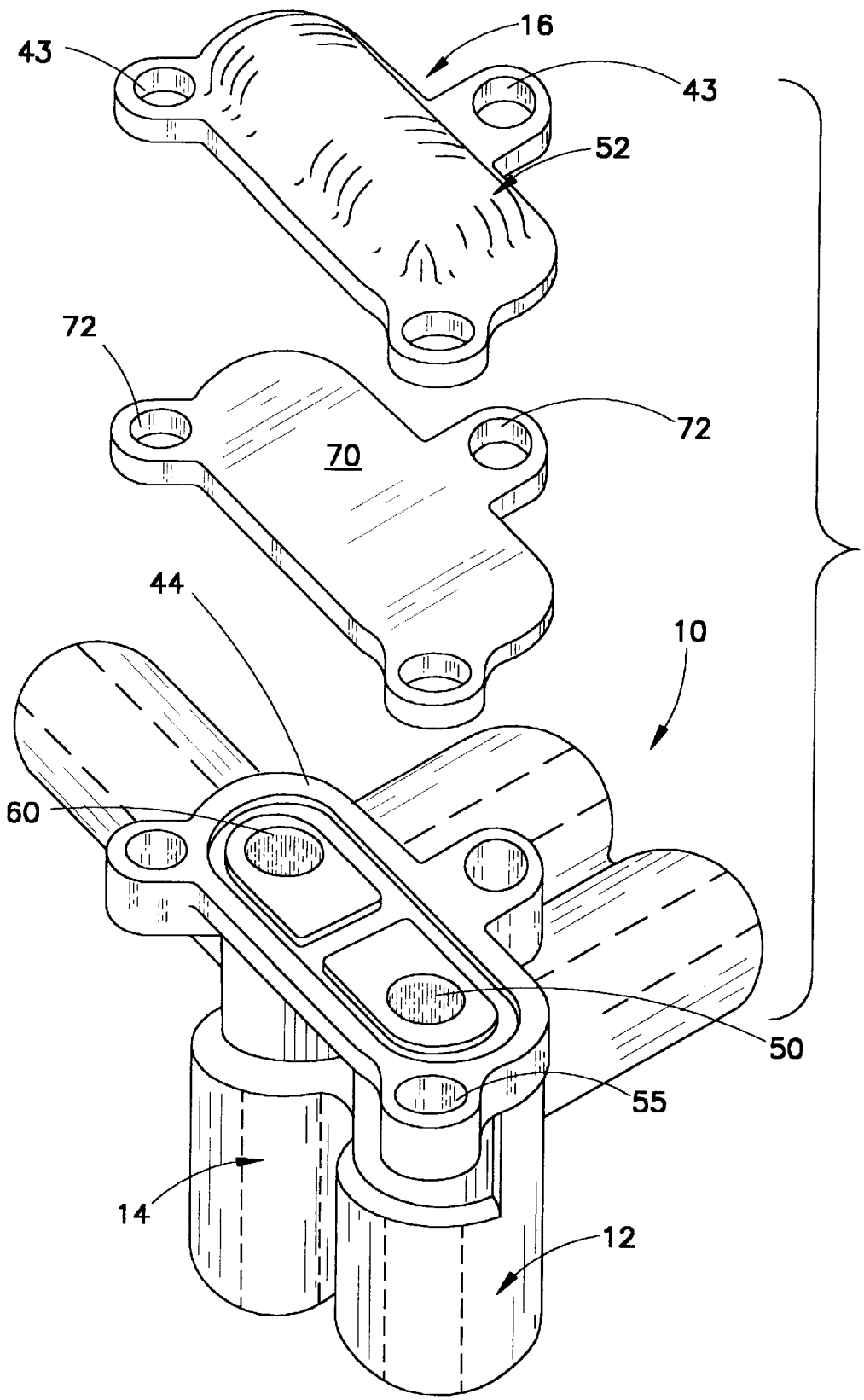
FIG. 4 is an exploded perspective view of the convertible manifold for a fuel delivery system constructed according to a second embodiment of the present invention.

In a second embodiment illustrated in FIG. 4, a blocking plate 70 is positioned between the manifold 10 and the cover 16 to segregate the first flowpath 12 from the second flowpath 14 by extending across the first aperture 50 and second aperture 60. The blocking plate 70 includes apertures 72 that align with the cover mounting apertures 43 and manifold mounting apertures 55 for placement on the manifold. The cover 16 includes a chamber 52 that extends substantially the entire cover length to extend across the first aperture 50 and second aperture 60 when positioned on the manifold.

Figure 5:
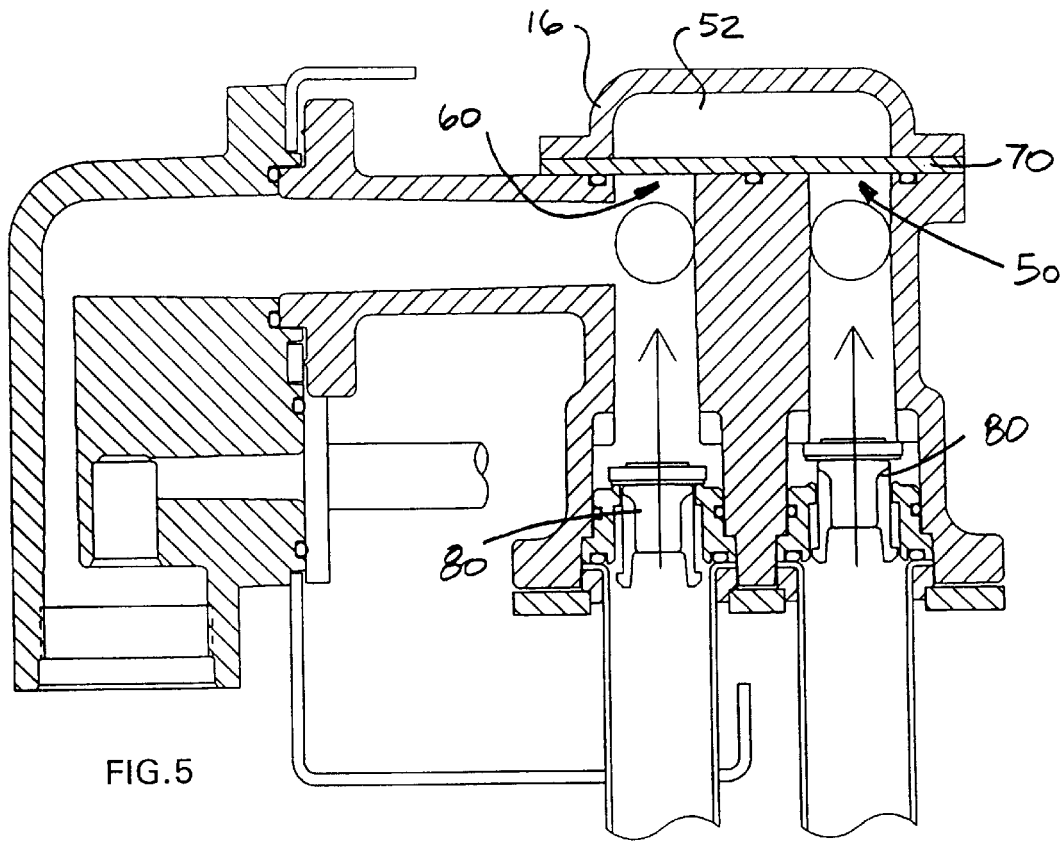
FIG. 5 is a side view of the second embodiment illustrating a blocking plate positioned between the manifold and the cover.
Figure 6:
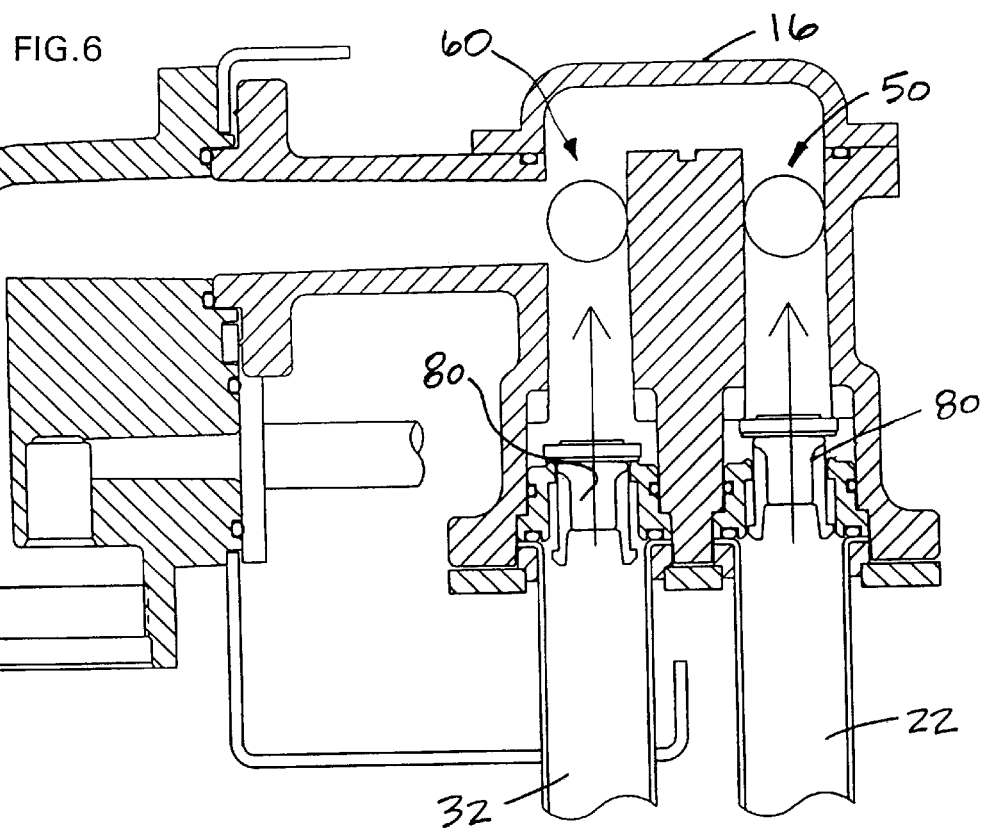
FIG. 6 is a side view of the second embodiment without the blocking plate.

FIG. 5 illustrates a closed, segregated position in which the blocking plate 70 is positioned over the first aperture 50 and second aperture 60 to stop fuel flow between the flowpaths. FIG. 6 illustrates an open position in which the blocking plate 70 has been removed and the cover chamber 52 extends over both apertures to allow communication between the flowpaths. The fasteners mounting the blocking plate 70 and cover 16 to the manifold are removable to accommodate either of the desired positions.

Check valves 80 may be included within the ports in either the first or second embodiments of the present invention to prevent fuel from flowing out of the manifold into the wrong port. By way of example as illustrated in FIG. 6, first port 22 and third port 32 are equipped with check valves 80 to prevent fuel that has been introduced into the manifold from re-entering these ports. One skilled in the art will understand that check valves are a common method of preventing contamination and keeping the fuel flowing in a single direction.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. An apparatus for receiving at least two different types of fuel and distributing said fuel to a dispenser unit, said apparatus comprising:
    a first flowpath between a first port and a second port;
    a second flowpath between a third port and a fourth port; and
    a cover selectively positionable between a first position segregating said first flowpath from said second flowpath, and a second position providing a shared flowpath between said first flowpath and said second flowpath.

2. The apparatus of claim 1, further including a third flowpath extending between a fifth port and one of said first or second flowpaths.

3. The apparatus of claim 2, wherein said second, fourth, and fifth ports are adaptable for either inputting or outputting said fuel from said manifold.

4. The apparatus of claim 2, further including blocking means positioned on each of said second, fourth, and fifth ports, said blocking means being selectively positionable between a closed position and an open position.

5. A manifold for dispensing fuel comprising:
    a) a manifold body having:
        i) a first flowpath extending between a first port and a second port;
        ii) a first aperture communicating with said first flowpath;
        iii) a second flowpath extending between a third port and a fourth port;
        iv) a second aperture communicating with said second flowpath; and
    b) a cover having a chamber and a blocking portion, said cover adapted to alternatively mount between a first position wherein said blocking portion prevents communication between said first and second apertures, and a second position wherein said chamber couples said first and second apertures providing communication between said first flowpath and said second flowpath.

6. The apparatus of claim 5, further including a mounting surface positioned about said first and second flowpaths for selectively mounting said cover in said first and second positions.

7. The apparatus of claim 5, wherein said blocking portion is a base portion configured to cover at least one of said first and second apertures in said first closed position.

8. The apparatus of claim 6, wherein said mounting surface further includes a plurality of mounts for receiving a plurality of fasteners to maintain said cover on said mounting surface.

9. The apparatus of claim 8, wherein said cover includes apertures that align with said mounts for receiving said fasteners, said apertures being symmetrically positioned about said cover providing said apertures to align with said mounts in said first position and said second position.

10. The apparatus of claim 5, wherein said chamber extends above said mounting surface.

11. The apparatus of claim 5, wherein said chamber extends below said mounting surface.

12. The apparatus of claim 5, wherein said manifold is operable for dispensing fuel in a multi-hose output design, a single-hose blended design, and a single-hose non-blended design.

13. A manifold for dispensing fuel comprising:
    a first flowpath extending between a first port and a second port;
    a second flowpath extending between a third port and a fourth port;
    a first auxiliary flowpath extending from said first flowpath to a cover mounting surface;
    a second auxiliary flowpath extending from said second flowpath to said cover mounting surface; and
    a cover adapted to alternatively mount to said cover mounting surface in a first position blocking flow between said first and second flowpaths and a second position to provide a flowpath between said first and second auxiliary flowpaths.

14. The apparatus of claim 13, further including fasteners for holding said cover to said cover mounting surface, said fasteners being removable for repositioning said cover in said first and said second positions.

15. The apparatus of claim 13, further including a fifth port for either inputting fuel into said manifold or outputting fuel from said manifold.

16. The apparatus of claim 15, wherein said fifth port communicates with said first, second, third, and fourth ports.

17. The apparatus of claim 13, further including blocking means positioned within said ports for selectively opening and closing said ports to fuel flow.

18. The apparatus of claim 13, wherein said chamber is positioned over said first flowpath or said second flowpath in said first position.

19. The apparatus of claim 17, wherein said cover is rotated approximately 180 degrees between said first position and said second position.

20. An apparatus for distributing fuel within a fuel distribution system comprising:

a main housing;

a plurality of ports connected with said main housing for inputting and outputting a product, said ports being selectively positionable between an open position to allow said product to pass through said port, and a closed position to prevent said product to pass through said port; and a cover positioned on said main housing for selectively directing the flow of said fuel through said main housing, wherein said apparatus being convertible between a multi-hose output design and a single hose output design.

21. A fuel dispenser having a manifold for receiving a plurality of input lines for bringing fuel into the manifold, and convertible to accommodate between a multi-hose output design and a single hose output design, said manifold comprising:

a first flowpath extending between a first port and a second port;

a second flowpath extending between a third port and a fourth port;

a cover mounted on the manifold and having a chamber positioned over said first flowpath and said second flowpath; and a blocking plate removably positionable between the manifold and said cover to segregate said first flowpath from said second flowpath.

22. The apparatus of claim 21, further including check valves positioned within said first and second flowpaths for preventing fuel from backflowing out of the manifold.

23. The apparatus of claim 21, wherein said blocking plate and said cover are removably mounted on said manifold by a plurality of fasteners.

24. The apparatus of claim 21, wherein said chamber extends substantially the length of said cover.

25. The apparatus of claim 21, further including a third flowpath extending between a fifth port and one of said first or second ports.

26. The apparatus of claim 25, wherein said second, fourth, and fifth ports are adaptable for either inputting or outputting said fuel from the manifold.

27. The apparatus of claim 21, wherein the manifold is operable for dispensing fuel in a multi-hose output design, a single-hose blended design, and a single-hose non-blended design.

28. A manifold for dispensing fuel comprising:

a first flowpath extending between a first port and a second port;

a second flowpath extending between a third port and a fourth port;

an auxiliary flowpath extending between said first flowpath and said second flowpath;

a cover having a chamber positionable over said auxiliary flowpath for allowing communication between said first flowpath and said second flowpath; and a blocking plate removably positionable over said auxiliary flowpath for segregating said first flowpath from said second flowpath.

* * * * *